US008609299B2

(12) United States Patent
Iju et al.

(10) Patent No.: US 8,609,299 B2
(45) Date of Patent: Dec. 17, 2013

(54) FUEL CELL SEALING STRUCTURE AND MANUFACTURE METHOD

(75) Inventors: Morihiro Iju, Ibaraki-Ken (JP); Shigeru Watanabe, Kanagawa-Ken (JP); Kenichi Oba, Kanagawa-Ken (JP)

(73) Assignee: NOK Corporation, Tokyo (JP)

(*) Notice: Subject to any disclaimer, the term of this patent is extended or adjusted under 35 U.S.C. 154(b) by 329 days.

(21) Appl. No.: 12/912,304

(22) Filed: Oct. 26, 2010

(65) Prior Publication Data

US 2011/0097647 A1  Apr. 28, 2011

(30) Foreign Application Priority Data

Oct. 28, 2009 (JP) ................. 2009-247228

(51) Int. Cl.
*H01M 2/08* (2006.01)

(52) U.S. Cl.
USPC ........... 429/509; 429/469; 429/507; 429/508; 429/511

(58) Field of Classification Search
USPC ............. 429/35, 36, 37, 38, 452, 467, 469, 429/507–511, 535; 264/279, 279.1, 264/241–247

See application file for complete search history.

(56) References Cited

U.S. PATENT DOCUMENTS

| 2003/0104262 | A1* | 6/2003 | Kuroki et al. | 429/36 |
| 2007/0003821 | A1 | 1/2007 | Belchuk | |
| 2008/0118811 | A1* | 5/2008 | Okabe | 429/35 |
| 2011/0311897 | A1* | 12/2011 | Kato | 429/480 |

FOREIGN PATENT DOCUMENTS

| JP | 2007-026847 A | 8/2007 |
| JP | 2009-064769 A | 9/2010 |
| WO | WO 2009028331 A1 * | 3/2009 |

* cited by examiner

*Primary Examiner* — Carlos Barcena
*Assistant Examiner* — Jimmy K Vo
(74) *Attorney, Agent, or Firm* — Daniel Sepanik, Esq.; Harness, Dickey & Pierce, P.L.C.

(57) ABSTRACT

A fuel cell seal structure includes a GDL which is formed by a porous body and a gasket which is integrally formed with a peripheral edge of a GDL. The GDL includes a rubber impregnation portion and an impregnation stopping portion. The gasket is integrally formed with a gasket body portion having a thickness dimension larger than a thickness dimension of the GDL and an overlap portion overlapping with the GDL in a plane other than a portion impregnated by the GDL. The rubber impregnation portion of the GDL includes an inner portion which is provided between the impregnation stopping portion and an outer portion overlapping with the overlap portion of the gasket in a plane so as not to overlap with the gasket in a plane.

3 Claims, 3 Drawing Sheets

US 8,609,299 B2

FUEL CELL SEALING STRUCTURE AND MANUFACTURE METHOD

CROSS-REFERENCE TO RELATED APPLICATIONS

This application claims the benefit and priority of Japanese Patent Application No. 2009-247228, filed Oct. 28, 2009. The entire disclosure of the above application is incorporated herein by reference.

FIELD

The present disclosure relates to a seal structural body that is a constituent element of a fuel cell, and a method of manufacturing thereof.

BACKGROUND

In forming a bonded Gas Diffusion Layer (GDL) and gasket of a fuel cell, the GDL is inserted by a tool and formed by injection molding. In doing this, the gasket is formed higher than the GDL in some cases, but if sealing on the back surface is required the gasket must be formed at the end of the GDL. In doing this, the strength of the bond between rubber and GDL is critical to assure the durability of the gasket. One method used in order to obtain low-cost goods while maintaining sufficient bonding strength in formation is to impregnate a portion of the GDL with rubber, however in configurations such as shown in FIG. 3 whereby gasket 52 is located outside GDL 51, result in difficulties in that the general thinness of the GDL prevents sufficient bonding strength. In FIG. 3, symbol 51 indicates the GDL, 52 indicates a gasket around its edge and formed as one unit therewith, and 53 indicates the rubber-impregnated part that causes gasket 52 to be formed as one unit with GDL 51.

As a means of resolving the above difficulty, methods exist of obtaining bond strength by causing gasket 52 and GDL 51 to overlap so as to increase the contact surface area, as shown in FIG. 4 and FIG. 5. The GDL, however, is an elastic material with high porosity and therefore low strength, so that when the flow of rubber in the GDL does not stop at the specified position, problems of defective formation occur as shown in FIG. 6, such as when a curvature S (see FIG. 6A) or fold O (see FIG. 6B) is formed on GDL 51. The reason that rubber does not stop at the specified position on GDL 51 is that GDL 51 is compressed and greatly deformed by the fastening part (T in FIG. 5) of tool 61, and therefore GDL 51 is bent upward by tensile stress created in the boundary end surface thereof, and the rubber ejection pressure is applied while it is in that state. Further, it is recognized that curvature of FDL 51 after forming can be restricted by reducing the compression ratio of GDL 51, however in this case the rubber material flows into the inside of GDL 51, giving rise to the problem that the reactive surface is reduced by the electro-generative operation of GDL 51. Because of the high porosity of GDL 51, in order to restrict the flow of rubber material it is necessary to close the tool with high compression of approximately 30-50%, and therefore it is difficult to restrict curvature in GDL 51.

Reference documents regarding prior art
Patent document 1 Patent Announcement JP2009-064769
Patent document 2 Patent Announcement JP2007-026847

SUMMARY

In view of the above points, the purpose of the present invention is a structural body for fuel cells capable of restricting the occurrence of defective formation, and a method of manufacture thereof, comprising a structural body for fuel cell seals formed as one unit with a gasket on the periphery of the GDL by means of a rubber impregnated structure, whereby occurrence of deformation such as curvature at the periphery of the GDL is restricted while also reactive surface area related to electrogenerative operation of the GDL is assured.

In order to achieve the aforementioned purpose, a seal structural body for fuel cells according to claim 1 of the present invention has a flat GDL of multiporous material providing a prescribed dimension of thickness, and a gasket of rubberlike elastic material formed as one unit with the peripheral part of said GDL, said GDL having a rubber elastic body comprising one part of said gasket that is caused to be impregnated in said GDL, thereby causing said gasket to have said rubber impregnated part formed as one unit with said GDL and present in the peripheral part of said GDL, and the thickness of said GDL being partially compressed as a result of pressure from the mold during forming, and thereby causing an impregnation stop part that restricts the area of impregnation in said rubber elastic body to be present in the inner part of said rubber impregnation area, and; said gasket having, in addition to parts caused to be impregnated in said GDL, a gasket main body part providing a thickness dimension greater than the thickness dimension of said GDL, being on the outside of said GDL and in a position that is not stacked over the surface of said GDL, and also having an overlap part that is stacked over the surface of said GDL and formed as one unit with the inside of said gasket main body; and said rubber impregnated part of the GDL having an inner part between said impregnation stop part and the outer part overlapped by said gasket overlap part, where said gasket is not stacked above the surface.

Also, a method of manufacture of a seal structural body for fuel cells comprises: a method of manufacture of the aforementioned seal structural body for fuel cells, whereby said injection molding is accomplished in a state of pressing one part of said GDL by means of a pressing part created in said tool and also retaining the inside position of said GDL by means of a retaining part created in said tool, whereby the mold for injection molding of said gasket with GDL inserted has; a pressing part as a mating part of a segmented mold, for the purpose of forming said impregnation stop part by applying pressure and compressing one part of said GDL during mold closing, and similarly has a retaining part as a mating part of said segmented mold for the purpose of retaining the inside position of said GDL during mold closing so as to prevent the occurrence of deformations such as curvature etc. on said GDL.

Further, a method of manufacture of a seal structural body for fuel cells comprises a method of manufacture of a seal structural body for fuel cells, whereby said pressing part created in the tool has a protruding shape, said retaining part crated in the tool has a stepped shape, and a chamber part is created in the step part of the said stepped shaped retaining part.

In a seal structural body according to the present invention having the aforementioned structure, the GDL is caused to be impregnated by a rubber-like elastic body such that a rubber impregnated part causing the gasket to be bonded with the GDL is created at the periphery of the GDL, and thereby the gasket is formed as one unit with the periphery of the GDL by means of said rubber impregnated part.

Also, by compression of a part of the thickness of the GDL by compression by means of the mold during forming, an impregnation stop part restricting the area of impregnation of the rubberlike elastic body is created at the inside of the rubber impregnated part, and therefore the range of impregnation of the rubber-like body is arrested by said impregnation stop part, assuring a reactive area in relation to the GDL electrogenerative operation.

Further, the gasket, in addition to the impregnated area of the GDL, is created with a gasket main body part having a thickness dimension greater than the thickness dimension of the GDL and located on the outside of the GDL in a location where it does not overlie the horizontal surface of the GDL, and also the gasket is created with an overlap part that does overlie the horizontal surface of the GDL formed as one unit on the inside of the gasket main body part, thereby providing a large contact surface area between the gasket and GDL by means of said gasket main body part and overlap part, assuring bonding strength.

In addition, the GDL rubber impregnated part is created with an inner part between said impregnation stop part and the outer part overlapped by said gasket overlap part, where the gasket does not overlie the horizontal surface, and therefore said inner part is retained by the mold during forming, thereby restricting deformation such as curvature etc. on the GDL due to injection pressure.

Also, in a method of manufacture according to the present invention, a pressing part is created in the mating part of a segmented mold in the mold forming the aforementioned GDL-gasket unit, and by means of said pressing part an impregnation part is formed by compression of one part of the GDL by pressure during mold closing. Likewise, a retaining part is created in the mating parts of the segmented mold, and by means of said retaining part the inside part of the GDL is retained during mold closing, thereby restricting the occurrence of deformations such as curvature etc. in the GDL. The pressing part has a protruding shape in order to press on the GDL locally, and the retaining part has a stepped shape so as to be positioned between the pressing part and the cavity space forming the overlap part of the gasket. Also, a chamfer part is created in the rising surface of the step-shaped retaining part, thereby enabling relief of tensile stress created in the GDL during injection. Note also that whereas the pressing part compresses the GDL by pressure, the retaining part only retains the GDL, ideally the rate of GDL compression from the pressing part is on the order of 20-50% but the rate of GDL compression from the retaining part is on the order of 0-10%.

The present invention accomplishes the following effects.

Namely, in a seal structural body for fuel cells and method of manufacture of same according to the present invention, the periphery of the GDL is formed as one body with the gasket by means of a rubber-impregnated part created in the GDL, impregnation of the rubber-like elastic body is prevented by said impregnated part, reactive area in relation to the electrogenerative operation of the GDL is assured, large bonding surface is created between the gasket and GDL by means of a gasket main body part and overlap part created in the gasket, bonding strength is assured, and the inside part created in the GDL is retained by the mold during formation, restricting the occurrence of deviations such as curvature in the GDL resulting from injection pressure. Thus in accordance with the intended purpose of the present invention, in a seal structural body wherein the gasket forms one unit with the periphery of the GDL by means of an impregnation structure, it is possible to assure reactive surface area in relation to the electrogenerative operation of the GDL while also restricting the occurrence of deformations such as curvature in the periphery of the GDL by restricting forming defects. Also, by creating a chamfer part in the rising surface of the step-shaped retaining part it is possible to relieve tensile stress created in the GDL during injection, and thereby further restrict the occurrence of deformations such as curvature.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Note that the following preferred embodiments are included in the present invention.

(1) Creation of a step difference in an overlapping part of a part having a GDL and gasket as one unit.

(2) Creation of a structure restricting deformation of the GDL occurring during mold closing, being a 2-level structure having a part that strongly closes the mold in order to restrict the flow of rubber and a pressing part virtually not compressing the GDL at all on its gasket side so as to prevent curvature deformation.

(3) In placing a gasket on a GDL, structures according to prior art have had problems of degradation of product quality from curvature occurring in the GDL from mold closure, however reduction of curvature has been verified in structures according to the present invention that implement a level difference for restriction of curvature. In the part that restricts rubber flow, it is necessary to close at a compression ratio of approximately 20-50% depending on the porosity of the GDL, and approximately 20-40% is ideal. At the same time, to restrict curvature in the GDL, it is effective to have GDL compression at no greater than 10%. From these facts, an excellent one-unit product with restricted curvature has been obtained by means of a 2-level structure with compression of 30% in the rubber-restricting part and 5% in the curvature preventing part.

(4) In addition, in particular the length of the level difference in the curvature preventing part should preferably be about 2 to 10 times the thickness of the GDL. As for the dimension of the overlap (the dimension of GDL extending after mold closing), a longer overlap increases the reliability of fastening strength, but reduces the effect of preventing curvature. Preferably the length of the level difference in the curvature restriction part should be approximately 3 to 5 times the thickness of the GDL, and the overlap dimension should be 5 to 10 times the thickness of the GDL, whereby the effect on curvature is obtained and also bonding strength is assured, while at the same time enabling the creation of a space-saving gasket.

The next section describes preferred embodiments of the present invention with reference to the drawings.

Figure 1:
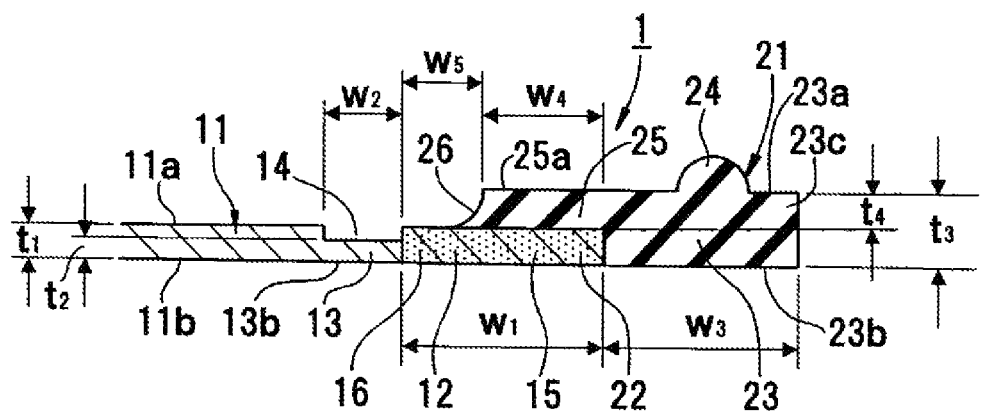
FIG. 1 is a cross sectional view of a seal structural body for fuel cells according to a preferred embodiment of the present invention.
Figure 2:
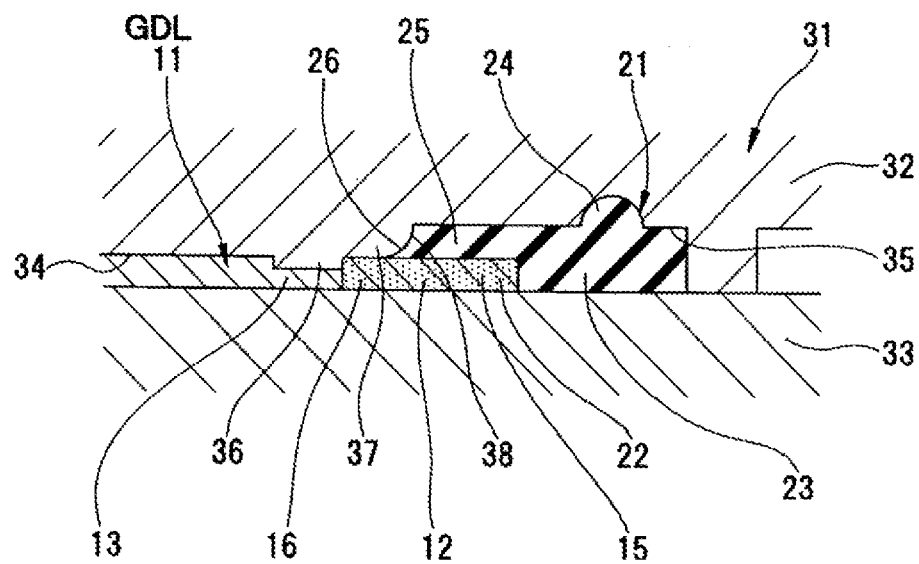
FIG. 2 is a cross sectional view showing a method of manufacture of the same seal structural body.
Figure 3:
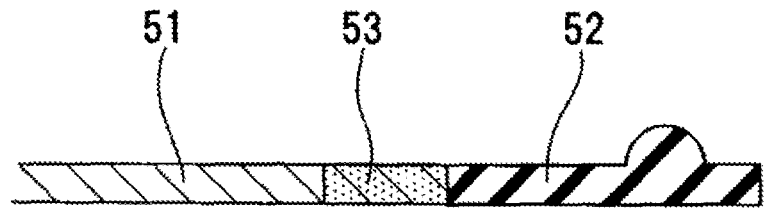
FIG. 3 is a cross sectional view of a seal structural body according to prior art.
Figure 4:
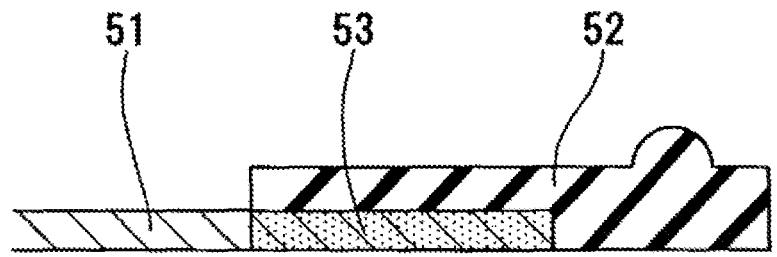
FIG. 4 is a cross sectional view of another seal structural body according to prior art.
Figure 5:
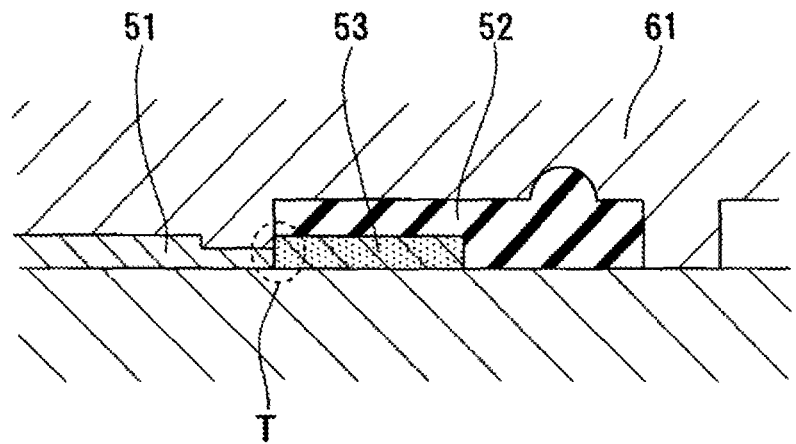
FIG. 5 is a cross sectional view of showing a method of manufacture of the same seal structural body.
Figure 6A:
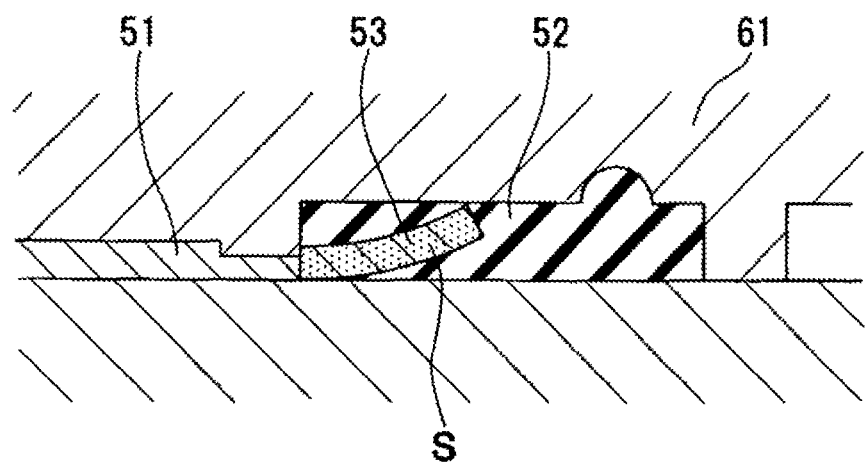
FIGS. 6A and 6B are cross sectional views showing the status of occurrence of problems in a method of manufacture of the same seal structural body.
Figure 6B:
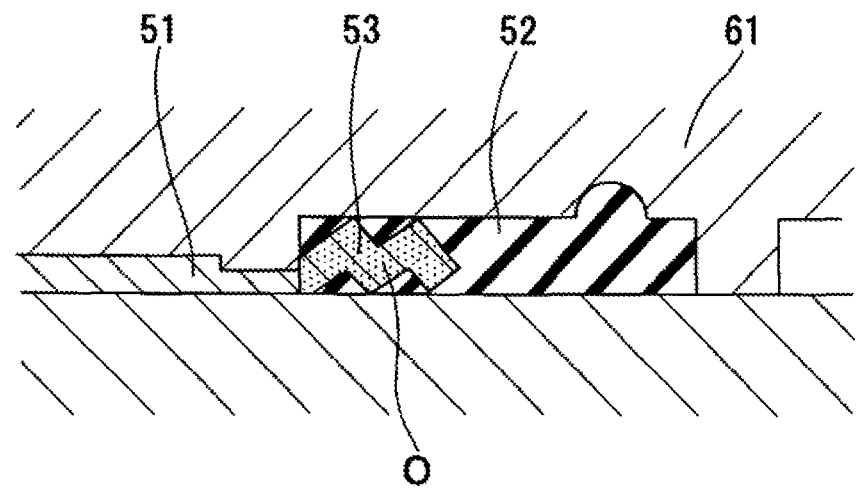

FIG. 1 is a cross section of the main elements of a seal structure for fuel cell 1 according to a preferred embodiment of the present invention, and the method of manufacture thereof is shown in FIG. 2 as a cross sectional view of the main elements of seal structure 1 and mold 31 whereby it is formed. Seal structure 1 according to said preferred embodiment is comprised as follows.

First said seal structure 1 has GDL 11 comprised of a flat multipore material having specified thickness dimension $t_1$, and gasket 21 of a rubber-like elastic material formed as one unit with the periphery of said GDL 11. GDL 11 is formed by stacking other structural elements of a fuel cell such as MEA (membrane electrode assemblies, not pictured), and MEAs etc. may also be placed in stacks between two GDLs 11. Gasket 21 acts in sealing the sealed fluids such as reaction fluids or coolant water etc., and is placed around the entire periphery of GDL 11 so as to surround the reactive region on the flat surface of GDL 11, and also so as to surround the manifold hole.

On GDL 11, rubber impregnated part 21 is created with specified width w1 around the periphery of GDL 11 for the purpose of making gasket 21 be bonded with GDL 11, by causing a portion of the rubber-like elastic material comprising gasket 21 to impregnate the multipore material (porous area) of GDL 11. In the drawing the rubber impregnated structure is shown by the small dots.

Also on GDL 11, impregnation stop part (GDL squeezing part) 13 is created immediately inside rubber-impregnated part 12 (on the left side of the drawing) and having specified thickness dimension $w_2$, for the purpose of regulating the impregnated region of the rubber-like elastic body by compressing a part of the thickness of GDL 11 by means of pressure from mold 31 during forming. Said impregnation stop part 13 regulates the impregnated region of the rubber-like elastic body because the porosity (air pocket ratio) is reduced by compression from mold 31. Thickness dimension $t_2$ of impregnation stopping part 13 is formed smaller than the original thickness dimension $t_1$ of GDL 11, and the compression ratio thereof ($t_2/t_1$) is approximately 20-25% and more preferably 20-40%. Also impregnation stop part 13 is formed by the formation of recessed part 14 in GDL 11 upper surface (one side) 11a, and lower surface 13b of impregnation stopping part 13 is formed in the same plane as lower surface (other surface) 11b of GDL 11.

At the same time, on gasket 21, impregnated position 22 is formed in the multipore material structure of GDL 11, and also gasket main body 23 being rectangular in cross section and having thickness dimension $t_3$ greater than the thickness dimension $t_1$ of GDL 11 is formed with specified width dimension $w_3$ on the outer side of GDL 11 (the right side in the drawing) and is placed so as not to stack above the flat surface of GDL 11. Lower surface 23b of said gasket main body 23 forms the same plane as lower surface 11b of GDL 11, and added thickness part 23c of gasket main body 23 is placed only on upper surface 11a of GDL 11. In addition, seal lip 24 is formed as one unit with upper surface 23a of gasket main body 23, however seal lip 24 may also be formed as one unit respectively with both upper surface 23a and lower surface 23b of gasket main body 23.

In addition, on gasket 21, overlap 25, rectangular in cross section and overlying above the surface of GDL 11, is formed as one unit immediately inside gasket main body 23 and having specified width dimension $w_4$. Said overlap part 25 lies over upper surface 11a of GDL 11, and upper surface 25a of overlap part 25 forms the same plane as upper surface 23a of gasket main body 23, and accordingly thickness dimension $t_4$ of overlap part 25 is set by the value of thickness dimension $t_3$ of gasket main body 23 less thickness dimension $t_1$ of GDL 11. In addition, width dimension $w_4$ of overlap part 25 is set smaller than the width dimension of aforementioned position 22 or in other words width dimension $w_1$ of rubber-impregnated part 12, and thereby inner location 16 having width dimension $w_5$ is formed on rubber-impregnated part 12 of GDL 11 where gasket 21 does not overlap the plane, between outer position 15 where overlap part 15 of gasket 21 lies over the surface (the width dimension of said outer part 15 is the same as that of overlap part 25 and is therefore $w_4$) and impregnation stop part 13. Also, on the rising surface of the inside of overlap part 25 on gasket 21, chamfer part 26 is placed so as to be arc shaped or sloping (a concave arc cross section in the drawing) such that the height dimension gradually increases from the inside toward the outside of said seal structure 1.

Next we describe mold 31 for forming seal structure 1 in the aforementioned configuration.

As shown in FIG. 2, said mold 31 is used for injection forming of gasket 21 while the mold is closed in the state of having GDL 11 inserted therein, and has upper and lower segmented mold (pair of segmented molds) 32, 33, and their opposing (mating) parts, and space 34 for the purpose of inserting GDL 11, and has cavity space 35 for the purpose of forming gasket 21.

Also, in the opposing part of upper mold (one of the segmented molds) 32, press part 36 is created for the purpose of forming impregnation stop part 13 in GDL 11, by pressing and compressing a part of GDL 11 when the mold is closed, and also retaining part 37 is created for the purpose of restricting the occurrence of deformations such as curvature in GDL 11 by retaining the inside position of GDL 11 during the same time when the mold is closed.

Press part 36 has a protruding shape extending up and down in the drawing, forming impregnation stop part 13 in GDL 11 by pressing and compressing GDL 11 between its end part and lower mold (the other segmented mold) 33. The compression ratio of the thickness of GDL 11 from press part 36 is set approximately from 20-50%, and more preferably 20-40%.

Regaining part 37 is placed between cavity space 35 and press part 36, and has a stepped shape, and restricts the occurrence of deformations such as curvature in GDL 11 by retaining the inner position of GDL 11 between its end part and lower mold 33. Note also that whereas press part 36 presses and compresses GDL 11, retaining part 37 only retains GDL 11, and therefore the compression ratio of the thickness of GDL 11 from retaining part 37 is less, and specifically is set at approximately 0 to 10%. Also, chamfer part 38 is created in the rising surface of retaining part 37, and said chamfer part 38 is arc shaped or sloping (a concave arc cross section in the drawing) such that the height dimension gradually increases from the inside toward the outside of said seal structure 1, whereby aforementioned chamfer part 26 is formed in gasket 21.

In a method of manufacture according to the aforementioned preferred embodiment aforementioned mold 31 is used, and injection forming of gasket 21 is accomplished with GDL 11 compressed by press part 36 and inside part 16 of GDL 11 retained by retaining part 37, and by means thereof a seal structure 1 is manufactured having the structure shown in FIG. 1.

In the aforementioned seal structure 1 and method of manufacture thereof, gasket 21 can be bonded with the periphery of GDL 11 by means of rubber-impregnated part 12 created in GDL 11, and also by means of impregnation stop part 13 it is possible to halt the impregnation of rubber-like elastic body and assure reactive surface in relation to the electrogenerative operation of GDL 11. Further, by means of gasket main part 23 and overlap part 25 created in gasket 21 it is possible to increase the contact surface area between gasket 21 and GDL 11 and assure contact strength, and by retaining inner position 16 created in GDL 11 by means of retaining part 37 in mold 31 it is possible to restrict the occurrence of deformations such as curvature from injection pressure in GDL 11. Accordingly, by means of a rubber impregnated structure in seal structure 1 having gasket 21 bonded with the periphery of GDL 11, it is possible to assure reactive surface area in regard to the electrogenerative operation of GDL 11 while also restricting the occurrence of deformation such as curvature in the periphery of GDL 11, and thereby it is possible to restrict the occurrence of formation defects. Also, because chamfer part 38 is formed in the rising surface of step shaped retaining part 37, it is possible to relieve tensile stress created in GDL 11 during injection, and thereby it is possible to restrict the occurrence of deformations such as curvature even more effectively.

DESCRIPTION OF SYMBOLS

1 . . . Seal structure for fuel cell
11 . . . GDL
11a, 23a, 25a Upper surface
11b, 13b, 23b Lower surface
12 . . . Rubber impregnated part
13 . . . Impregnation stop part
14 . . . Recessed part
15 . . . Outside position
16 . . . Inside position
21 . . . Gasket
22 . . . Impregnated position
23 . . . Gasket main body
23c . . . Added thickness part
24 . . . Seal lip
25 . . . Overlap part
26 . . . Chamfer part
31 . . . Mold
32, 33 . . . Segmented molds
34, 35 . . . Space
36 . . . Press part
37 . . . Retaining part
38 . . . Chamfer part The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fuel cell sealing structure comprising:
a gas diffusion layer (GDL) which is formed by a planar porous body having a predetermined thickness dimension; and
a rubber-like elastic gasket which is integrally formed with a peripheral edge of the gas diffusion layer (GDL),
wherein the GDL includes a rubber impregnation portion which is provided in the peripheral edge of the GDL so as to be integrated with the GDL by impregnating a part of a rubber-like elastic body constituting the gasket in the GDL and an impregnation stopping portion which is provided on the inside of the rubber impregnation portion so as to define an impregnation region of the rubber-like elastic body by compressing a part of the thickness of the GDL by a pressure of a mold during molding,
wherein the gasket includes a gasket body portion which is provided at a position on the outside of the GDL and not overlapping with the GDL so as to have a thickness dimension larger than a thickness dimension of the GDL in a plane other than a portion impregnated by the GDL and an overlap portion which is provided on the inside of the gasket body portion so as to overlap with the GDL in a plane, and wherein the rubber impregnation portion of the GDL includes an inner portion which is provided between the impregnation stopping portion and an outer portion overlapping with the overlap portion of the gasket in a plane so as not to overlap with the gasket in a plane, said overlap portion being spaced from and non-overlapping with said impregnation stopping portion, said overlap portion having a first width ($W_4$) that is smaller than a second width ($W_1$) of the rubber impregnation portion, said overlap portion having an inner perimeter defining a chamfered edge spaced from an inner edge of the rubber impregnation portion.

2. A method of manufacturing a fuel cell sealing structure comprising a GDL which is formed by a planar porous body having a predetermined thickness dimension; and a rubber-like elastic gasket which is integrally formed with a peripheral edge of the GDL, wherein the GDL includes a rubber impregnation portion which is provided in the peripheral edge of the GDL so as to be integrated with the GDL by impregnating a part of a rubber-like elastic body constituting the gasket in the GDL and an impregnation stopping portion which is provided on the inside of the rubber impregnation portion so as to define an impregnation region of the rubber-like elastic body by compressing a part of the thickness of the GDL by a pressure of a mold during molding, wherein the gasket includes a gasket body portion which is provided at a position on the outside of the GDL and not overlapping with the GDL so as to have a thickness dimension larger than a thickness dimension of the GDL in a plane other than a portion impregnated by the GDL and an overlap portion which is provided on the inside of the gasket body portion so as to overlap with the GDL in a plane, and wherein the rubber impregnation portion of the GDL includes an inner portion which is provided between the impregnation stopping portion and an outer portion overlapping with the overlap portion of the gasket in a plane so as not to overlap with the gasket in a plane;
wherein a mold for molding a gasket by injection while a GDL is inserted includes a pressing portion which is provided in a facing portion of a split piece so as to form the impregnation stopping portion by compressing and pressing a part of the GDL during a mold clamping operation, and a holding portion which is provided in the facing portion of the split piece so as to suppress deformation such as warpage from occurring in the GDL by holding an inner portion of the GDL during the clamping operation, and
wherein the injection molding is performed while a part of the GDL is compressed by the pressing portion provided in the mold and the inner portion of the GDL is held by the holding portion provided in the mold, said overlap portion being spaced from and non-overlapping with said impregnation stopping portion, said overlap portion having a first width ($W_4$) that is smaller than a second width ($W_1$) of the rubber impregnation portion, said overlap portion having an inner perimeter defining a chamfered edge spaced from an inner edge of the rubber impregnation portion.

3. The method of manufacturing the fuel cell sealing structure as claimed in claim 2, wherein the pressing portion provided in the mold is formed in a protrusion shape, and the holding portion provided in the mold is formed in a step shape, and wherein a rising surface of the step-shaped holding portion is provided with a chamfered portion for forming the chamfered edge.

* * * * *